United States Patent
Evans et al.

(10) Patent No.: US 12,331,687 B1
(45) Date of Patent: Jun. 17, 2025

(54) CRYOGENIC FUEL SEMI-CLOSED INJECTION COOLED BOTTOMING CYCLE

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/793,126

(22) Filed: Aug. 2, 2024

(51) Int. Cl.
| | |
|---|---|
| *F02C 7/224* | (2006.01) |
| *F02C 3/20* | (2006.01) |
| *F02C 3/22* | (2006.01) |
| *F02C 6/18* | (2006.01) |
| *F02C 7/22* | (2006.01) |
| *F02C 1/10* | (2006.01) |
| *F02C 7/32* | (2006.01) |

(52) U.S. Cl.
CPC ............ *F02C 7/224* (2013.01); *F02C 3/20* (2013.01); *F02C 3/22* (2013.01); *F02C 6/18* (2013.01); *F02C 1/10* (2013.01); *F02C 7/22* (2013.01); *F02C 7/32* (2013.01)

(58) Field of Classification Search
CPC .... F02C 7/22; F02C 7/224; F02C 3/20; F02C 3/22; F02C 6/18
See application file for complete search history.

(56) References Cited

U.S. PATENT DOCUMENTS

| | | | | |
|---|---|---|---|---|
| 10,989,117 | B2* | 4/2021 | Roberge | F02C 3/22 |
| 11,041,439 | B2* | 6/2021 | Roberge | F02C 7/224 |
| 11,603,798 | B1* | 3/2023 | Terwilliger | F02C 7/18 |
| 11,635,022 | B1* | 4/2023 | Terwilliger | F02C 7/12 60/775 |
| 12,031,485 | B1* | 7/2024 | Terwilliger | F02C 3/305 |
| 12,065,964 | B1* | 8/2024 | Terwilliger | F02C 6/18 |
| 12,215,622 | B1* | 2/2025 | Terwilliger | F02C 3/22 |
| 12,215,623 | B1* | 2/2025 | Terwilliger | F02C 3/30 |
| 12,215,624 | B1* | 2/2025 | Evans | F02C 7/18 |
| 2023/0212983 | A1* | 7/2023 | Sibilli | F02C 7/14 60/730 |

(Continued)

FOREIGN PATENT DOCUMENTS

WO 2023072623 A1 5/2023

*Primary Examiner* — William H Rodriguez
(74) *Attorney, Agent, or Firm* — Carlson, Gaskey & Olds, P.C.

(57) ABSTRACT

An aircraft propulsion system includes a core engine that includes a combustor where a cryogenic fuel is mixed with compressed air and ignited to generate an exhaust gas flow, a propulsive fan driven by shaft power that is generated by the core engine, a cryogenic fuel system that includes a cryogenic fuel storage tank, a fuel flow path where a fuel flow is circulated from upstream in a direction downstream toward the combustor of the core engine, a bottoming compressor where a gaseous fuel flow is compressed, a first heat exchanger where the gaseous fuel flow exhausted from the bottoming compressor is heated, a turboexpander where the gaseous fuel flow from the first heat exchanger is expanded to generate shaft power, and a mixer where the gaseous fuel flow mixes with and heats a liquid fuel flow to generate a gaseous fuel flow for communication to the bottoming compressor.

20 Claims, 4 Drawing Sheets

(56) References Cited

U.S. PATENT DOCUMENTS

| | | |
|---|---|---|
| 2023/0280032 A1 | 9/2023 | Clark et al. |
| 2024/0026824 A1* | 1/2024 | Terwilliger ............... F02C 3/22 |
| 2024/0133343 A1 | 4/2024 | Palmer et al. |
| 2024/0360787 A1* | 10/2024 | Evans ....................... F02C 3/30 |
| 2024/0360788 A1* | 10/2024 | Evans ....................... F02C 3/22 |
| 2024/0360791 A1* | 10/2024 | Evans ..................... F02C 1/007 |
| 2024/0369015 A1* | 11/2024 | Evans ....................... F02C 1/08 |
| 2025/0075655 A1* | 3/2025 | Terwilliger ............. F02C 7/141 |

\* cited by examiner

CRYOGENIC FUEL SEMI-CLOSED INJECTION COOLED BOTTOMING CYCLE

TECHNICAL FIELD

The present disclosure relates generally to a bottom cycle for an aircraft propulsion system utilizing a cryogenic fuel as a working fluid for recovering thermal energy.

BACKGROUND OF THE INVENTION

Gas turbine engines typically include a compressor where inlet air is compressed, mixed with fuel, and ignited to generate a high energy gas flow. The high energy gas flow is expanded through a turbine to generate shaft power. Some energy is recovered as the gas flow expands through the turbine section. However, a significant amount of energy in the form of heat is simply exhausted to atmosphere. A bottoming cycle utilizes heat recovered from the gas flow to heat a working fluid that is used to generate additional useful work. The amount of work generated in a bottoming cycle is limited by the capability of the working fluid to accept heat.

SUMMARY OF THE INVENTION

An aircraft propulsion system according to an exemplary embodiment of this disclosure, among other possible things includes a core engine that includes a combustor where a cryogenic fuel is mixed with compressed air and ignited to generate an exhaust gas flow, a propulsive fan driven by shaft power that is generated by the core engine, a cryogenic fuel system that includes a cryogenic fuel storage tank, a fuel flow path where a fuel flow is circulated from upstream in a direction downstream toward the combustor of the core engine, a bottoming compressor where a gaseous fuel flow is compressed, a first heat exchanger where the gaseous fuel flow exhausted from the bottoming compressor is heated, a turboexpander where the gaseous fuel flow from the first heat exchanger is expanded to generate shaft power, and a mixer where the gaseous fuel flow mixes with and heats a liquid fuel flow to generate a gaseous fuel flow for communication to the bottoming compressor.

In a further embodiment of the foregoing aircraft propulsion systems, the mixer is configured to receive the gaseous fuel flow that is exhausted from the turboexpander.

In a further embodiment of any of the foregoing aircraft propulsion systems, the fuel flow path further includes a junction where a first portion of the gaseous fuel flow from the bottoming compressor is routed to the combustor and a second portion of the gaseous fuel flow from the bottoming compressor is communicated to the first heat exchanger.

In a further embodiment of any of the foregoing aircraft propulsion systems, the fuel flow path further includes a junction where a first portion of the gaseous fuel flow exhausted from the first heat exchanger is routed to the combustor and a second portion of the gaseous fuel flow from the first heat exchanger is routed to the turboexpander.

In a further embodiment of any of the foregoing aircraft propulsion systems, the fuel flow path further includes a junction where a first portion of the gaseous fuel flow exhausted from the turboexpander is routed to the combustor and a second portion of the gaseous fuel flow from the turboexpander is routed to the mixer.

In a further embodiment of any of the foregoing, the aircraft propulsion system further includes a second heat exchanger where the gaseous fuel flow is heated and communicated to the combustor.

In a further embodiment of any of the foregoing aircraft propulsion systems, the second heat exchanger communicates thermal energy from the exhaust gas flow into the gaseous fuel flow.

In a further embodiment of any of the foregoing aircraft propulsion systems, the turboexpander drives an output shaft that is coupled to drive an accessory device.

In a further embodiment of any of the foregoing aircraft propulsion systems, the accessory device includes a generator.

In a further embodiment of any of the foregoing aircraft propulsion systems, the turboexpander is coupled to drive the bottoming compressor.

A gas turbine engine assembly according to another exemplary embodiment of this disclosure, among other possible things includes a compressor, a combustor and a turbine coupled to an engine shaft, a mix of air and fuel is ignited in the combustor to generate an exhaust gas flow that is expanded through the main turbine to drive the engine shaft and subsequently exhausted through an exhaust nozzle, a propulsive fan that is driven by the engine shaft, a cryogenic fuel system that includes a cryogenic fuel storage tank, a fuel flow path where a fuel flow is circulated from upstream in a direction downstream to the combustor, a bottoming cycle system that includes a bottoming compressor configured to pressurize a gaseous fuel flow, a turboexpander configured to generate shaft power from expansion of the gaseous fuel flow, a first heat exchanger, and a mixer where the gaseous fuel flow mixes with and heats a liquid fuel flow to generate a gaseous fuel flow for communication to the bottoming compressor.

In a further embodiment of the foregoing gas turbine engine assembly, the fuel flow path further includes a junction where a first portion of the gaseous fuel flow from the bottoming compressor is routed to the combustor and a second portion of the gaseous fuel flow from the bottoming compressor is communicated to the first heat exchanger.

In a further embodiment of any of the foregoing gas turbine engine assemblies, the fuel flow path further includes a junction where a first portion of the gaseous fuel flow exhausted from the first heat exchanger is routed to the combustor and a second portion of the gaseous fuel flow from the first heat exchanger is routed to the turboexpander.

In a further embodiment of any of the foregoing gas turbine engine assemblies, the fuel flow path further includes a junction where a first portion of the gaseous fuel flow exhausted from the turboexpander is routed to the combustor and a second portion of the gaseous fuel flow from the turboexpander is routed to the mixer.

In a further embodiment of any of the foregoing, the gas turbine engine assembly further includes a second heat exchanger where the gaseous fuel flow is heated and communicated to the combustor.

In a further embodiment of any of the foregoing gas turbine engine assemblies, the second heat exchanger communicates thermal energy from the exhaust gas flow into the gaseous fuel flow.

In a further embodiment of any of the foregoing gas turbine engine assemblies, the turboexpander drives an output shaft that is coupled to drive at least on of an accessory device, a generator, and the bottoming compressor.

A method of assembling an aircraft propulsion system according to another exemplary embodiment of this disclosure, among other possible things includes assembling a core engine that includes a combustor where a cryogenic fuel is mixed with compressed air and ignited to generate an exhaust gas flow, assembling a propulsive fan configured to be driven by shaft power that is generated by the core engine, assembling a cryogenic fuel system to include a cryogenic fuel storage tank, and a fuel flow path where a fuel flow is circulated from upstream in a downstream direction to the combustor, and assembling a bottoming cycle system to include a bottoming compressor that is configured to pressurize a gaseous fuel flow, a turboexpander that is configured to generate shaft power from expansion of the gaseous fuel flow, a first heat exchanger that is configured to heat the gaseous fuel flow, and a mixer where the gaseous fuel flow mixes with and heats a liquid fuel flow to generate a gaseous fuel flow for communication to the bottoming compressor.

In a further embodiment of the foregoing, the method further includes assembling a second heat exchanger that is configured to further heat the gaseous fuel flow communicated to the combustor.

In a further embodiment of any of the foregoing, the method further includes operating at least one of the bottoming compressor and the turboexpander to create conditions at the mixer to generate the gaseous fuel flow.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
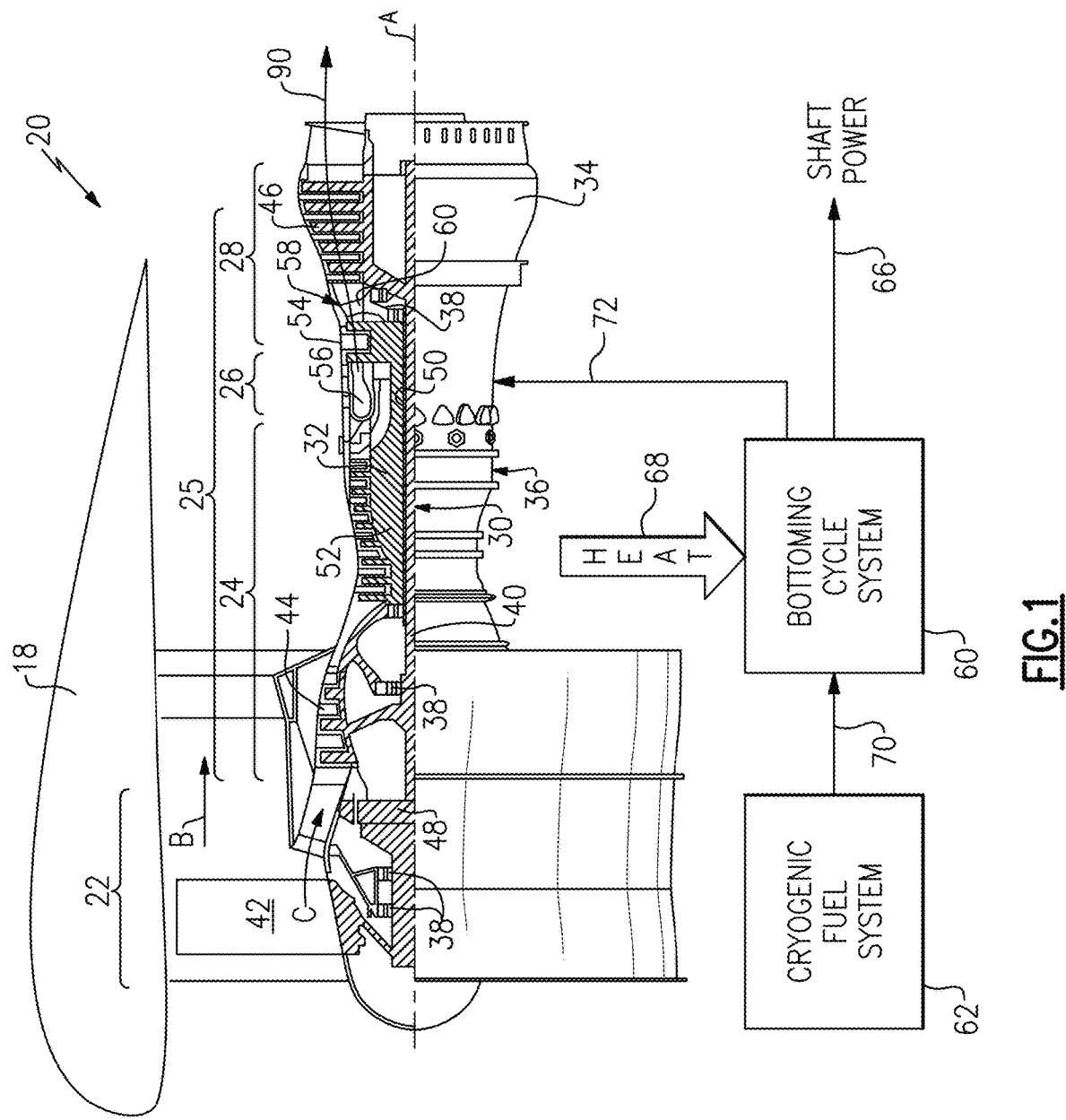
FIG. 1 is a schematic view of an example aircraft propulsion system including a cryogenic fuel system and bottom cycle system.

FIG. 1 schematically shows an aircraft propulsion system 20 that includes a cryogenic fuel system 62 and a bottoming cycle system 60. The bottoming cycle system 60 uses a cryogenic fuel as a working fluid to both heat liquid fuel prior to introduction into a core engine 25 and to generate power from recovered thermal energy.

The bottoming cycle system 60 generates shaft power 66 from thermal energy 68 that is input into a flow of cryogenic fuel 70. The heat input into the cryogenic fuel is also used to generate power and to vaporize a fuel flow 72 for injection into a combustor 56. The liquid cryogenic fuel 70 is sufficiently cool that care is required to prevent freezing of other fluids that come into thermal contact, including fluids that may be used to heat and vaporize the fuel. The disclosed system uses a heated gaseous fuel to heat the liquid fuel and thereby avoid problematic interactions with other fluids.

The example propulsion system 20 is disclosed as a two-spool turbofan that generally incorporates a fan section 22 and a core engine 25 that generates an exhaust gas flow for driving the fan section 22. The core engine 25 includes a compressor section 24, a combustor section 26, and a turbine section 28. The fan section 22 may include a single-stage fan having a plurality of fan blades 42. The fan blades 42 may have a fixed stagger angle or may have a variable pitch to direct incoming airflow from an engine inlet. The fan 22 drives air along a bypass flow path B defined within a nacelle 18, and also drives air along a core flow path C for compression and communication into the combustor section 26 then expansion through the turbine section 28. Exhaust gas flow is finally exhausted through a nozzle 34.

The exemplary core engine 25 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner engine shaft 40 that interconnects, a first (or low) pressure compressor 44 and a first (or low) pressure turbine 46. The inner engine shaft 40 is connected to the fan section 22 through a speed change mechanism, which in one example is illustrated as a geared architecture 48 to drive the fan section 22 at a lower speed than the low speed spool 30. The inner engine shaft 40 may interconnect the low pressure compressor 44 and low pressure turbine 46 such that the low pressure compressor 44 and low pressure turbine 46 are rotatable at a common speed and in a common direction. Although this application discloses geared architecture 48, its teaching may benefit direct drive engines having no geared architecture.

The high speed spool 32 includes an outer engine shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner engine shaft 40 and the outer engine shaft 50 are concentric and rotate via bearing systems 38 about the engine central longitudinal axis A which is collinear with their longitudinal axes.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

Figure 2:
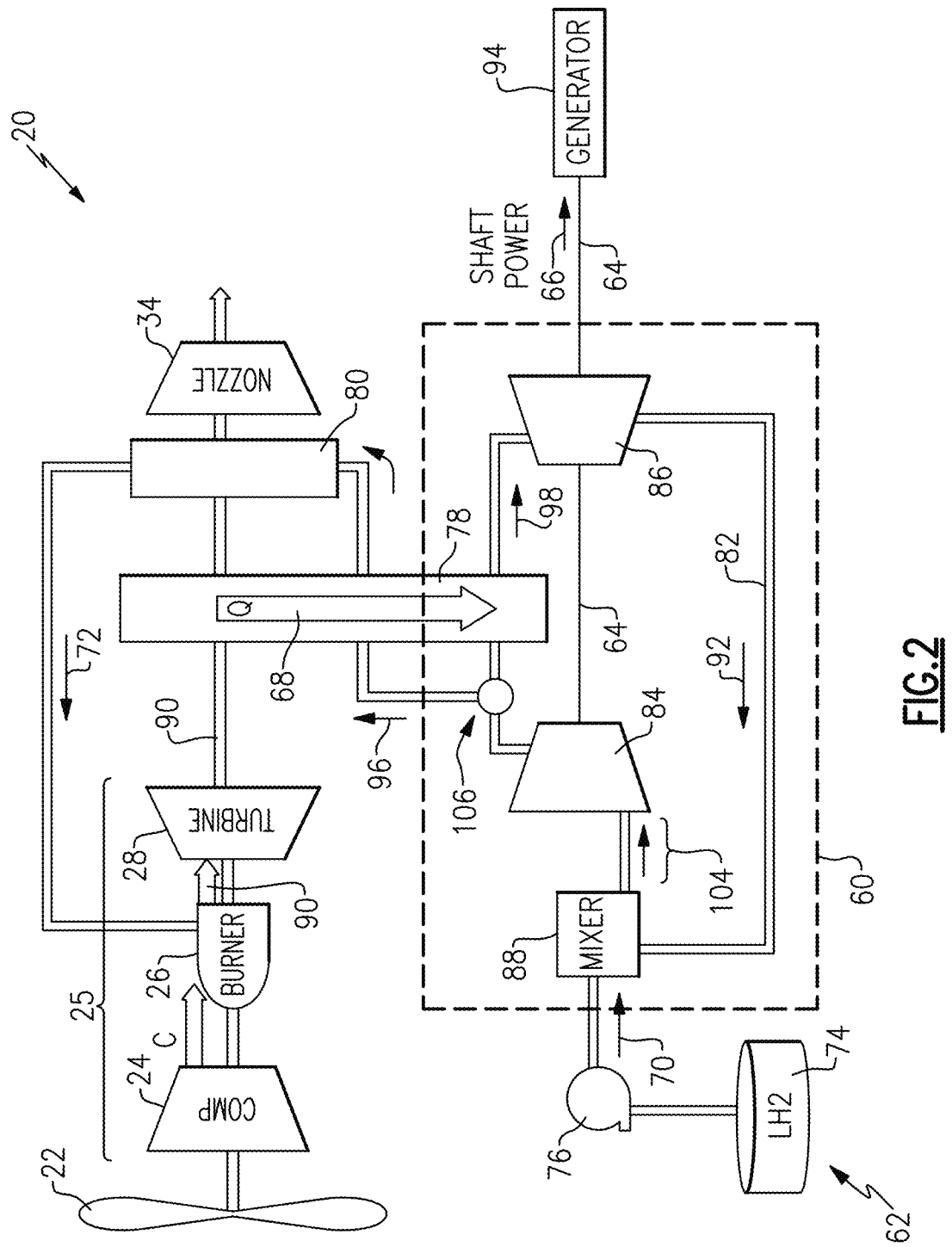
FIG. 2 is a simplified schematic view of an example aircraft propulsion system including a cryogenic fuel system and bottom cycle system.

Referring to FIG. 2 with continued reference to FIG. 1, a simplified schematic view of the propulsion system 20 is shown. The cryogenic fuel system 62 includes at least a fuel tank 74 and a fuel pump 76 to provide a liquid fuel flow 70 to the combustor 26 through a fuel flow path 82. The fuel flow path 82 defines a path from upstream at the fuel tank 74 in a downstream direction toward the combustor 26. Moreover, the downstream direction may also be considered as a direction of fuel flow away from the fuel tank 74. The example fuel system 62 is configured to provide a hydrogen based fuel such as a liquid hydrogen (LH$_2$). Although hydrogen is disclosed by way of example, other cryogenic, non-carbon based fuels could be utilized and are within the contemplation of this disclosure.

The fuel tank 74 includes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 74 at temperatures below −100° F. The cryogenic fuel may be maintained at temperatures below about −150° F. and as low as about −435° F.

The fuel system 62 communicates a liquid fuel to the bottoming cycle system 60. The bottoming cycle system 60 includes a bottoming compressor 84, a turboexpander 86 and a mixer 88. A heated fuel flow 92 downstream of the turboexpander 86 is used to boil and vaporize the liquid fuel flow 70 upstream in the mixer 88 prior to compression in the bottoming compressor 84. Accordingly, a fuel flow 104 exhausted from the mixer 88 and communicated to the bottoming compressor 84 is in a gaseous state.

Pressurized gaseous fuel exhausted from the bottoming compressor 84 is directed to a junction 106. At the junction 106, the fuel flow is split into a first portion 96 directed toward the combustor 26 and a second portion directed toward the turboexpander 86.

The second portion 98 of the fuel flow is heated in a first heat exchanger 78 by heat 68 from the exhaust gas flow 90. The first portion 96 of the pressurized fuel flow from the bottoming compressor 84 is heated in a second heat exchanger 80 to assure the fuel flow 72 is vaporized before being directed into the combustor section 26. The second heat exchanger 80 is in thermal communication with the exhaust gas flow 90 exhausted from the turbine section 28 of the core engine 25.

In one example embodiment, the second heat exchanger 80 is downstream from the first heat exchanger 78. However, the relative positions of the first heat exchanger 78 and the second heat exchanger 80 may be changed and remain within the contemplation of this disclosure. Moreover, although the first heat exchanger 78 and the second heat exchanger 80 are shown by way of example, other heat exchangers may be included to input heat into either or both of the first portion and the second portion of the fuel flow. Additionally, although thermal energy from the exhaust gas flow 90 is described and shown in the disclosed example, heat from other sources may also be utilized and are within the contemplation and scope of this disclosure.

The second portion 98 of the pressurized fuel flow is directed to the turboexpander 86 after being heated within the first heat exchanger 78. The heated and pressurized fuel flow is expanded through the turboexpander 86 to generate shaft power 66 to drive the shaft 64. In one disclosed example embodiment, the shaft 64 drives a generator 94. The shaft 64 may be coupled to drive other accessory devices such as fuel pumps, hydraulic pumps, and/or may be coupled to one of the engine shafts to supplement engine operation. Moreover, in one example embodiment, the shaft 64 is coupled to drive the bottoming compressor 84.

The fuel flow 92 exhausted from the turboexpander 86 retains sufficient heat and pressure to at least partially vaporize the liquid fuel flow 70 upstream in the mixer 88. The example mixer 88 includes associated conduits and valves to provide for boiling of the liquid fuel flow 70 prior to introduction into the bottoming compressor 84.

Figure 3:
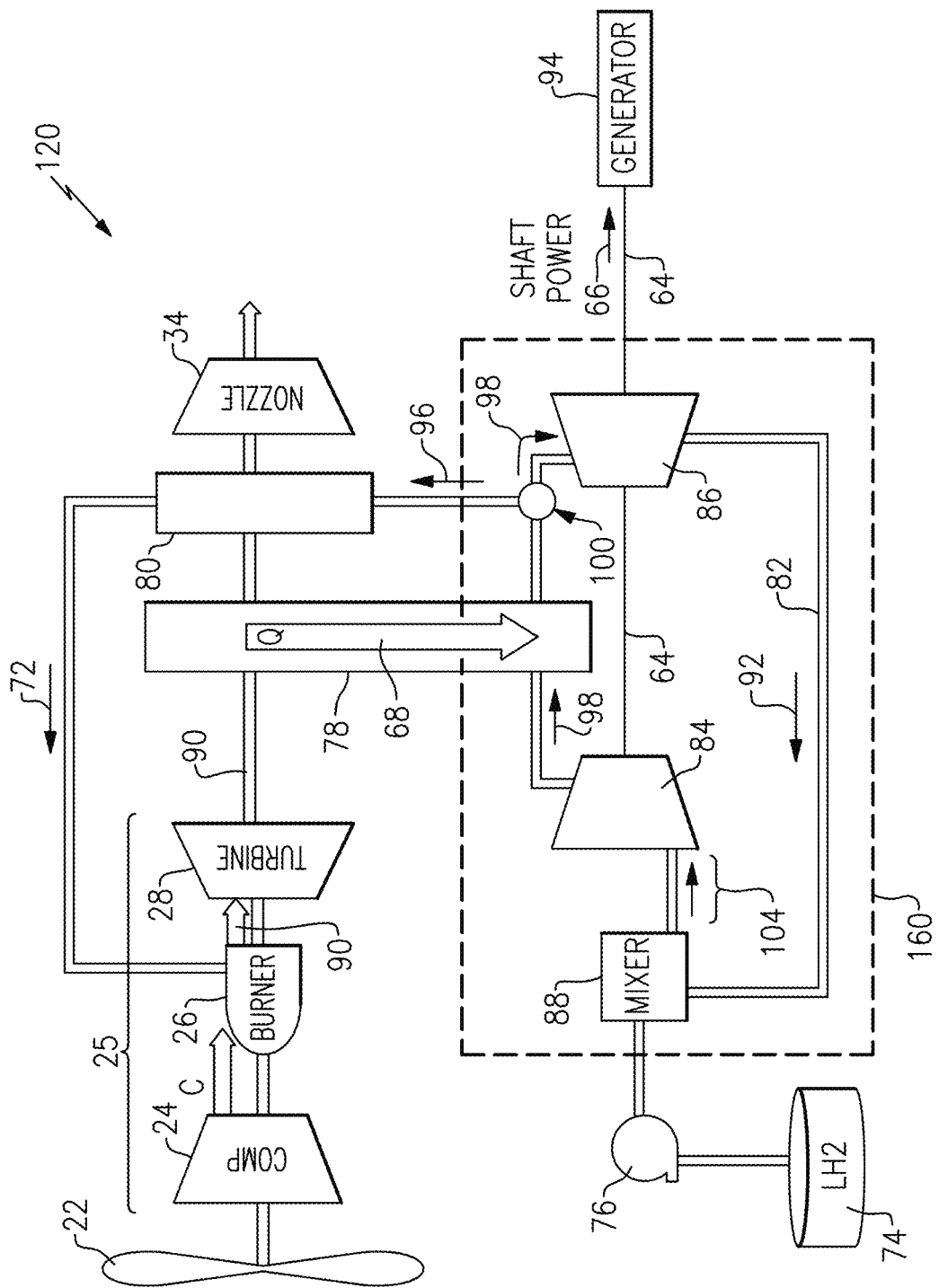
FIG. 3 is a simplified schematic view of another example aircraft propulsion system including a cryogenic fuel system and bottom cycle system.

Referring to FIG. 3, another propulsion system 120 is schematically shown and includes a bottoming cycle 160. The bottoming cycle 160 includes a junction 100 that is disposed downstream of the first heat exchanger 78 and before, or upstream of the turboexpander 86. In the bottoming cycle 160, the fuel flow is heated upstream and prior to being split into the first portion 96 and the second portion 98 at the junction 100. The increased heat input into the first fuel flow 96 may provide for a smaller second heat exchanger 80 while still assuring that the fuel is vaporized prior introduction into the combustor section 26 of the core engine 25.

Figure 4:
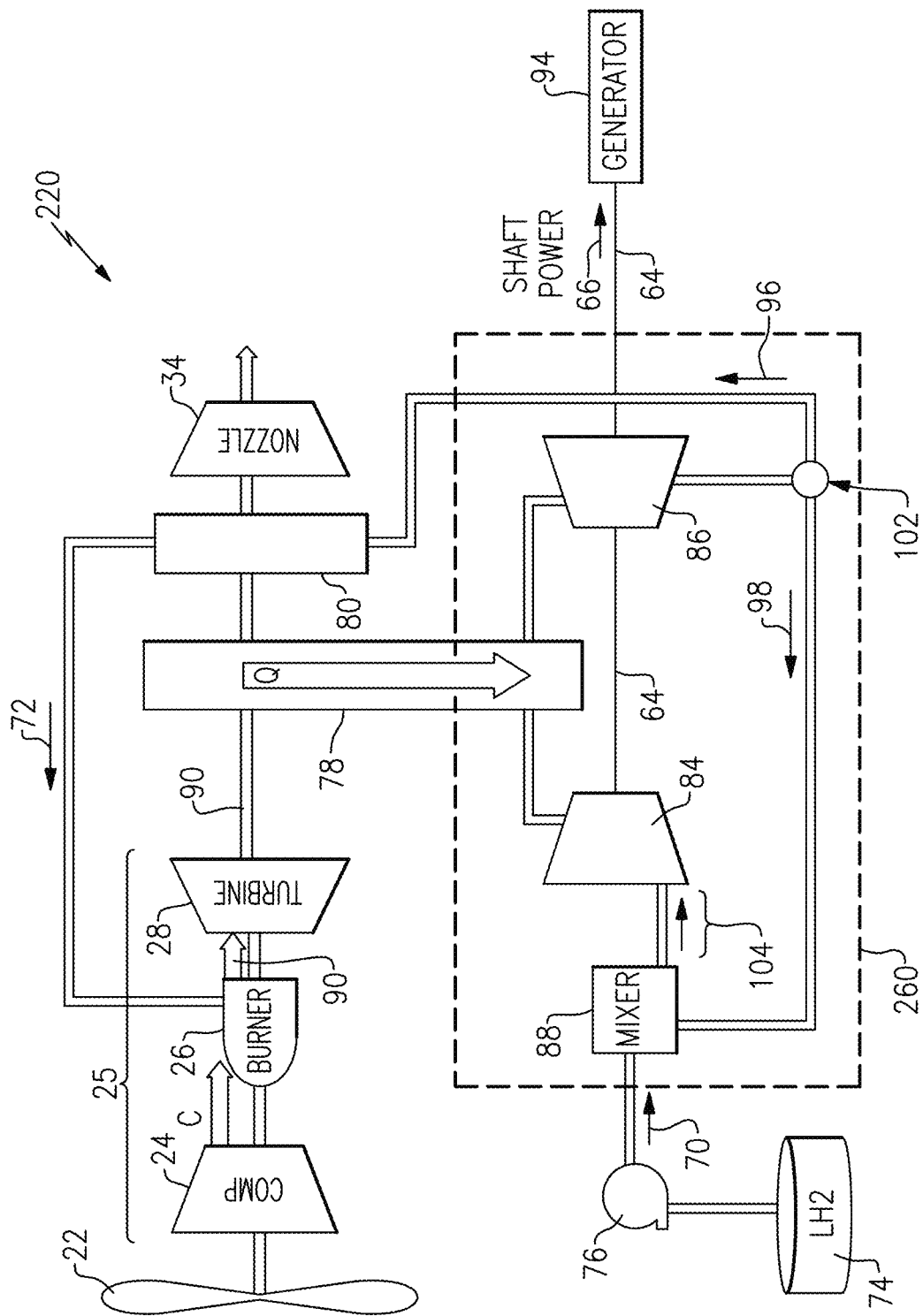
FIG. 4 is a simplified schematic view of yet another example aircraft propulsion system including a cryogenic fuel system and bottom cycle system.

Referring to FIG. 4, another propulsion system 220 is schematically shown and includes a bottoming cycle 260 with a junction 102 where the fuel flow is split into the first fuel flow 96 and the second fuel flow 98. The junction 102 is disposed after the turboexpander and before the mixer 88. Accordingly, all of the fuel flow compressed in the bottoming compressor 84 and heated in the first heat exchanger 78 is expanded through the turboexpander 86. Directing all of the fuel flow through the turboexpander 86 may provide an increased power output. Alternatively, directing all of the fuel flow through the turboexpander 86 may provide for different turboexpander configurations to tailor power generation by the bottoming cycle system 260 to application specific requirements.

Accordingly, the disclosed example cryogenic fuel system and bottoming cycle systems improve engine operating efficiencies by using cryogenic fuel as both a working fluid to recover thermal energy and to heat and vaporize liquid fuel prior to introduction into a core engine 25.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:
   a core engine comprising a combustor where a cryogenic fuel is mixed with compressed air and ignited to generate an exhaust gas flow;
   a propulsive fan driven by shaft power generated by the core engine;
   a cryogenic fuel system comprising a cryogenic fuel storage tank;
   a fuel flow path where a fuel flow is circulated from upstream in a direction downstream toward the combustor of the core engine;
   a bottoming compressor where a gaseous fuel flow is compressed;
   a first heat exchanger where the gaseous fuel flow exhausted from the bottoming compressor is heated;
   a turboexpander where the gaseous fuel flow from the first heat exchanger is expanded to generate shaft power; and
   a mixer where the gaseous fuel flow mixes with and heats a liquid fuel flow to generate a gaseous fuel flow for communication to the bottoming compressor.

2. The aircraft propulsion system as recited in claim 1, wherein the mixer is configured to receive the gaseous fuel flow exhausted from the turboexpander.

3. The aircraft propulsion system as recited in claim 1, wherein the fuel flow path further comprises a junction where a first portion of the gaseous fuel flow from the bottoming compressor is routed to the combustor and a second portion of the gaseous fuel flow from the bottoming compressor is communicated to the first heat exchanger.

4. The aircraft propulsion system as recited in claim 1, wherein the fuel flow path further comprises a junction where a first portion of the gaseous fuel flow exhausted from the first heat exchanger is routed to the combustor and a second portion of the gaseous fuel flow from the first heat exchanger is routed to the turboexpander.

5. The aircraft propulsion system as recited in claim 1, wherein the fuel flow path further comprises a junction where a first portion of the gaseous fuel flow exhausted from the turboexpander is routed to the combustor and a second portion of the gaseous fuel flow from the turboexpander is routed to the mixer.

6. The aircraft propulsion system as recited in claim 1, further comprising a second heat exchanger where the gaseous fuel flow is heated and communicated to the combustor.

7. The aircraft propulsion system as recited in claim 6, wherein the second heat exchanger communicates thermal energy from the exhaust gas flow into the gaseous fuel flow.

8. The aircraft propulsion system as recited in claim 1, wherein the turboexpander drives an output shaft coupled to drive an accessory device.

9. The aircraft propulsion system as recited in claim 8, wherein the accessory device comprises a generator.

10. The aircraft propulsion system as recited in claim 1, wherein the turboexpander is coupled to drive the bottoming compressor.

11. A gas turbine engine assembly comprising:
a compressor, a combustor and a turbine coupled to an engine shaft, wherein a mix of air and fuel is ignited in the combustor to generate an exhaust gas flow that is expanded through the main turbine to drive the engine shaft and subsequently exhausted through an exhaust nozzle;
a propulsive fan driven by the engine shaft;
a cryogenic fuel system comprising a cryogenic fuel storage tank;
a fuel flow path where a fuel flow is circulated from upstream in a direction downstream to the combustor; and
a bottoming cycle system comprising a bottoming compressor configured to pressurize a gaseous fuel flow, a turboexpander configured to generate shaft power from expansion of the gaseous fuel flow, a first heat exchanger, and a mixer where the gaseous fuel flow mixes with and heats a liquid fuel flow to generate a gaseous fuel flow for communication to the bottoming compressor.

12. The gas turbine engine assembly as recited in claim 11, wherein the fuel flow path further comprises a junction where a first portion of the gaseous fuel flow from the bottoming compressor is routed to the combustor and a second portion of the gaseous fuel flow from the bottoming compressor is communicated to the first heat exchanger.

13. The gas turbine engine assembly as recited in claim 11, wherein the fuel flow path further comprises a junction where a first portion of the gaseous fuel flow exhausted from the first heat exchanger is routed to the combustor and a second portion of the gaseous fuel flow from the first heat exchanger is routed to the turboexpander.

14. The gas turbine engine assembly as recited in claim 11, wherein the fuel flow path further comprises a junction where a first portion of the gaseous fuel flow exhausted from the turboexpander is routed to the combustor and a second portion of the gaseous fuel flow from the turboexpander is routed to the mixer.

15. The gas turbine engine assembly as recited in claim 12, further comprising a second heat exchanger where the gaseous fuel flow is heated and communicated to the combustor.

16. The gas turbine engine assembly as recited in claim 15, wherein the second heat exchanger communicates thermal energy from the exhaust gas flow into the gaseous fuel flow.

17. The gas turbine engine assembly as recited in claim 11, wherein the turboexpander drives an output shaft coupled to drive at least on of an accessory device, a generator, and the bottoming compressor.

18. A method of assembling an aircraft propulsion system comprising
assembling a core engine comprising a combustor where a cryogenic fuel is mixed with compressed air and ignited to generate an exhaust gas flow;
assembling a propulsive fan configured to be driven by shaft power generated by the core engine;
assembling a cryogenic fuel system to comprise a cryogenic fuel storage tank, and a fuel flow path where a fuel flow is circulated from upstream in a downstream direction to the combustor; and
assembling a bottoming cycle system to comprise a bottoming compressor configured to pressurize a gaseous fuel flow, a turboexpander configured to generate shaft power from expansion of the gaseous fuel flow, a first heat exchanger configured to heat the gaseous fuel flow, and a mixer where the gaseous fuel flow mixes with and heats a liquid fuel flow to generate a gaseous fuel flow for communication to the bottoming compressor.

19. The method as recited in claim 18, further comprising assembling a second heat exchanger configured to further heat the gaseous fuel flow communicated to the combustor.

20. The method as recited in claim 18, further comprising operating at least one of the bottoming compressor and the turboexpander to create conditions at the mixer to generate the gaseous fuel flow.

* * * * *